United States Patent
Shang et al.

(10) Patent No.: US 9,169,124 B2
(45) Date of Patent: Oct. 27, 2015

(54) CRYSTALLIZATION SYSTEM AND METHOD FOR PRODUCING SODIUM ALUMINUM FLUORIDE CRYOLITE FROM HYDROFLUORIC ACID WASTE

(71) Applicant: RETECH ENVIRONMENTAL SOLUTIONS CO., LTD., Taichung (TW)

(72) Inventors: Neng-Chou Shang, Taichung (TW); Tsung-Lung Lu, Taichung (TW); Chao-Chien Chang, Taichung (TW)

(73) Assignee: RETECH ENVIRONMENTAL SOLUTIONS CO., LTD., Taichung (TW)

( * ) Notice: Subject to any disclaimer, the term of this patent is extended or adjusted under 35 U.S.C. 154(b) by 44 days.

(21) Appl. No.: 14/219,340

(22) Filed: Mar. 19, 2014

(65) Prior Publication Data

US 2015/0266747 A1    Sep. 24, 2015

(51) Int. Cl.
*C13K 1/10* (2006.01)
*C01D 3/02* (2006.01)
*B01D 9/00* (2006.01)

(52) U.S. Cl.
CPC ............ *C01D 3/02* (2013.01); *B01D 9/0063* (2013.01); *B01D 2009/009* (2013.01)

(58) Field of Classification Search
CPC .................................. B01D 9/00; C13K 1/10
USPC ....................................................... 23/295 R
See application file for complete search history.

(56) References Cited

U.S. PATENT DOCUMENTS 4,830,836 A * 5/1989 Uchino et al. ................ 423/139

* cited by examiner

*Primary Examiner* — Edward Johnson
(74) *Attorney, Agent, or Firm* — Patent Office of Bang Shia

(57) ABSTRACT

A crystallization system for producing sodium aluminum fluoride cryolite from hydrofluoric acid waste includes a crystallization reaction tank, a sodium aluminate tank, a high concentration hydrofluoric acid waste tank, a pH value/fluoride detecting section, a dehydrator, a low concentration hydrofluoric acid waste tank, and a control device. The crystallization reaction tank includes a dispersing plate and the control plate to control the flow rate and liquid form of the sodium aluminate and the hydrofluoric acid waste. The loop-like pH value/fluoride detecting section is in communication with the reaction tank to detect the pH value/fluoride concentration of the water sample which is the aqueous mixture of sodium aluminate and hydrofluoric acid waste. Therefore, the crystallization system is capable of controlling factors affecting the cryolite purity during the operation process, and consequently, the crystallization system can produce cryolite whose purity is good enough for recycling.

24 Claims, 7 Drawing Sheets though with the loop-like pH value/fluoride detecting section which is in communication with the reaction tank, and by detecting the pH value/fluoride concentration of the water sample which is the aqueous mixture of the sodium aluminate and hydrofluoric acid waste, the crystallization system and method for producing sodium aluminum fluoride cryolite from hydrofluoric acid waste in accordance with the present invention, are capable of effectively controlling the factor affecting the cryolite purity during the operation process. Hence, it ensures that the crystallization system can produce cryolite whose purity is good enough for recycling.

CRYSTALLIZATION SYSTEM AND METHOD FOR PRODUCING SODIUM ALUMINUM FLUORIDE CRYOLITE FROM HYDROFLUORIC ACID WASTE

BACKGROUND OF THE INVENTION

1. Field of the Invention

The present invention relates to a crystallization system, and more particularly to a crystallization system and method for producing sodium aluminum fluoride cryolite from hydrofluoric acid waste.

2. Description of the Prior Art

High concentration hydrofluoric acid (HF, 49%) or hydrofluoric acid mixture are widely used for etching purpose in science and technology fields, such as semiconductor (IC), liquid display panel (TFT-LCD), and solar cells. Hence, large quantity of waste hydrofluoric acid of various concentrations (from 49% to 0.5%) is produced and needs to be waste treated.

The existing methods for disposal of waste hydrofluoric acid include treating with Calcium compounds, including $CaO$、$Ca(OH)_2$、$CaCl_2$ and etc, which will produce $CaF_2$ after reacting with the fluoride of the waste. Or, the waste hydrofluoric acid can be added with specific chemical agents to solidify and remove the fluoride. The above two methods are costly and difficult to implement. Besides, the volume of the CaF2 sludge is very large, and the percentage of the Caf2 whose purity is high enough to meet recycling standard is very low. The latter method can produce $Na_3AlF_6$, but it has to use PAC (Polyalumi-num Chloride) as coagulant, which will affect the crystalline purity of the cryolite.

It is to be noted that sodium aluminum fluoride cryolite can be generated from hydrofluoric acid and sodium aluminate through the following chemical equations: $12HF + 3NaAlO_2 \rightarrow Na_3AlF_6 + 2AlF_3 + H_2O$. Based on the above method, the inventor of this application has filed a patent application in Taiwan, which is titled "crystallization system and method for producing sodium aluminum fluoride cryolite from hydrofluoric acid waste", as shown in FIG. 1. The crystallization system a sodium aluminate chemical tank V2 and a high concentration of hydrofluoric acid waste tank V1, from where the liquid wastes flow through a batch quantity control section F1, F2, through a constant flow and uniform dosing section A which is located at the top portion of the reaction tank of the crystallization system, and a batch crystallization reaction section R which is located at the lower portion of the reaction tank. The constant flow and uniform dosing section A is provided with dispersing aperture of batch dosing of sodium aluminate into the hydrofluoric acid waste. The mixture is crystallized on standing and then moved to the microfiltration section S to remove cryolite, and then the filtered liquid waste flows to a low concentration hydrofluoric acid wastewater treatment section W for further processing.

The purity of the obtained cryolite is as high as 96%, however, the factor affecting the cryolite purity not only involves the way the hydrofluoric acid and sodium aluminate contact and react, but also includes the percentage of impurities contained in the solutions, PH value of the solutions, and etc.

The present invention has arisen to mitigate and/or obviate the afore-described disadvantages.

SUMMARY OF THE INVENTION

The primary objective of the present invention is to provide a crystallization system for producing sodium aluminum fluoride cryolite from hydrofluoric acid waste. With the dispersing plate and the control plate controlling the flow rate and liquid form of the sodium aluminate and the hydrofluoric acid waste, with the loop-like pH value/fluoride detecting section which is in communication with the reaction tank, and by detecting the pH value/fluoride concentration of the water sample which is the aqueous mixture of the sodium aluminate and hydrofluoric acid waste, the crystallization system and method for producing sodium aluminum fluoride cryolite from hydrofluoric acid waste in accordance with the present invention, are capable of effectively controlling the factor affecting the cryolite purity during the operation process. Hence, it ensures that the crystallization system can produce cryolite whose purity is good enough for recycling.

To achieve the above objective, a crystallization system for producing sodium aluminum fluoride cryolite from hydrofluoric acid waste in accordance with the present invention comprises: a control device, a crystallization reaction tank, a high concentration hydrofluoric acid waste tank, and a pH value/fluoride detecting section. The crystallization reaction tank includes a top input port and a bottom output port, inside the crystallization reaction tank is disposed a dispersing plate which is formed with a plurality of dispersing apertures, and a control plate is located above the dispersing plate and formed with a plurality of control apertures. The interior of the crystallization reaction tank is divided by the dispersing plate and the control plate into an upper dosing space and a lower reaction space. In the upper dosing space is provided a sodium aluminate level meter, the lower reaction space is in communication with a discharge control section via the output port to discharge cryolite and low concentration hydrofluoric acid waste produced by reaction. The sodium aluminate level meter and the discharge control section are electrically controlled by the control device. The sodium aluminate tank are electrically controlled by the control device and includes a batch dosing control section through which sodium aluminate flows from the sodium aluminate tank to the upper dosing space of the crystallization reaction tank. The high concentration hydrofluoric acid waste tank is electrically controlled by the control device and includes a batch dosing control section through which high concentration hydrofluoric acid waste is transported from the high concentration hydrofluoric acid waste tank to the lower reaction space of the crystallization reaction tank. The pH value/fluoride detecting section includes a pH meter and a fluoride meter which are electrically connected by wires and controlled by the control device. The pH meter includes a first passage which is in communication with a bottom of the lower reaction space of the crystallization reaction tank, the fluoride meter including a second passage which is in communication with a top of the upper reaction space.

A method for operating the crystallization system for producing sodium aluminum fluoride cryolite from hydrofluoric acid waste in accordance with the present invention comprises the following steps: a first step of using the control device to set parameters, after all parameters are set, the dispersing plate and the control plate are set to meet flow rate requirement of the sodium aluminate, so as to control the flow rate of the sodium aluminate flowing into the lower reaction space; a second step of turning on the batch dosing control section of the high concentration hydrofluoric acid waste tank to introduce high concentration hydrofluoric acid into the lower space of the crystallization reaction tank by the amount set in first step; a third step of turning on the batch dosing control section of the sodium aluminate tank to introduce sodium aluminate into the upper dosing space of the crystallization reaction tank, after the high concentration hydrofluoric acid waste tank is introduced into the crystallization reaction tank; a fourth step of letting water sample stand for a length of time set in the first; the water sample is an aqueous mixture of sodium aluminate and high concentration hydrofluoric acid waste; a fifth step of turning on the pH value/fluoride detecting section to introduce the water sample from the crystallization reaction tank into the pH value/fluoride detecting section, then carrying out a step of detecting pH value/fluoride concentration of the water sample, and a step of reintroducing the water sample back into the crystallization reaction tank; a sixth step of determining whether reaction ends or not based on the pH value and fluoride concentration detected, if the reaction does not end, a step of turning off the pH value/fluoride detecting section, and a step of micro adjusting the dosing of the sodium aluminate will be carried out, then a step of introducing a micro amount of sodium aluminate into the crystallization reaction tank, based on the parameters set in the first step and based on the pH value detected is carried out, then, the third, fourth, fifth and sixth steps will be carried out again until the reaction ends; and a seventh step of turning on the dehydrator and the discharge control section of the crystallization reaction tank, then a step of dehydrating and collecting cryolite, and a step of discharging low concentration hydrofluoric acid waste are carried out, and after that, a step of turning off the discharge control section of the crystallization reaction tank is carried out.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
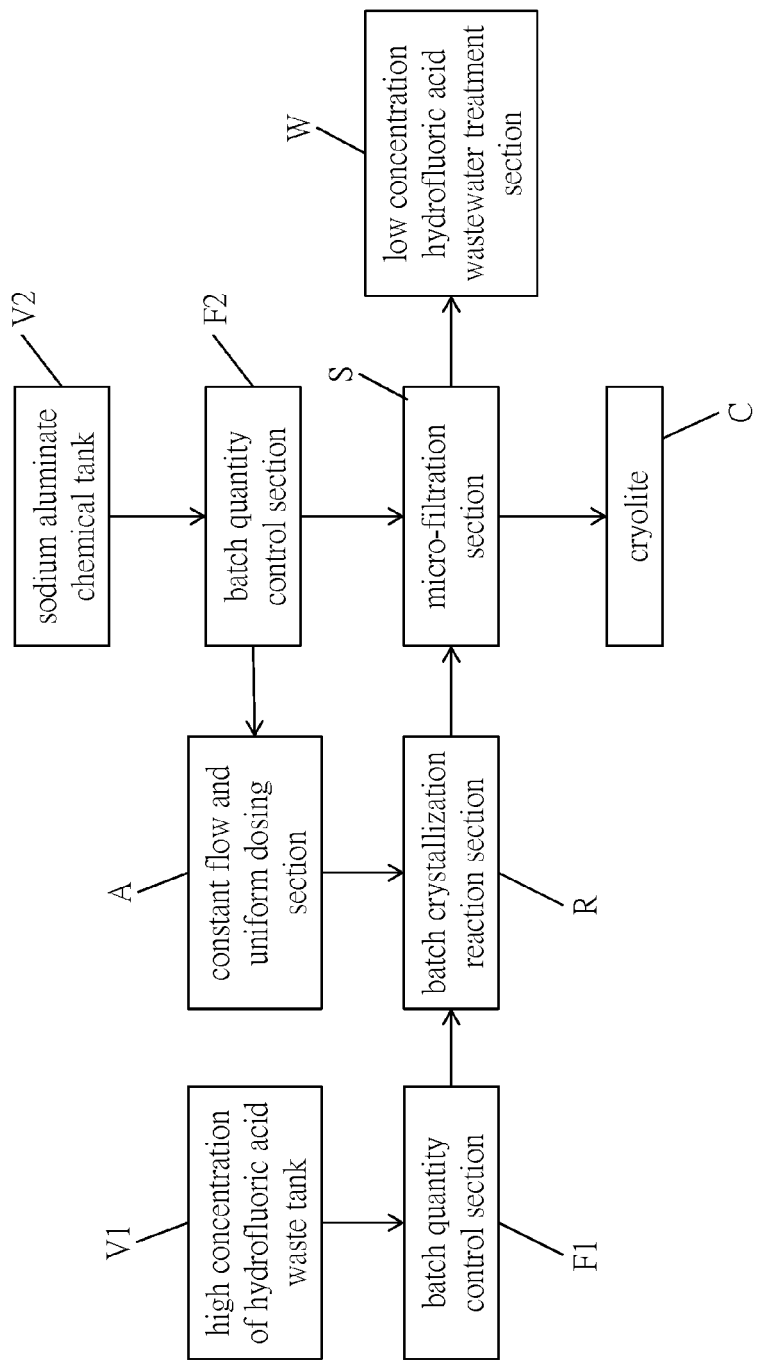
FIG. 1 is a flow chart illustrating a conventional crystallization system for producing sodium aluminum fluoride cryolite from hydrofluoric acid waste.
Figure 2:
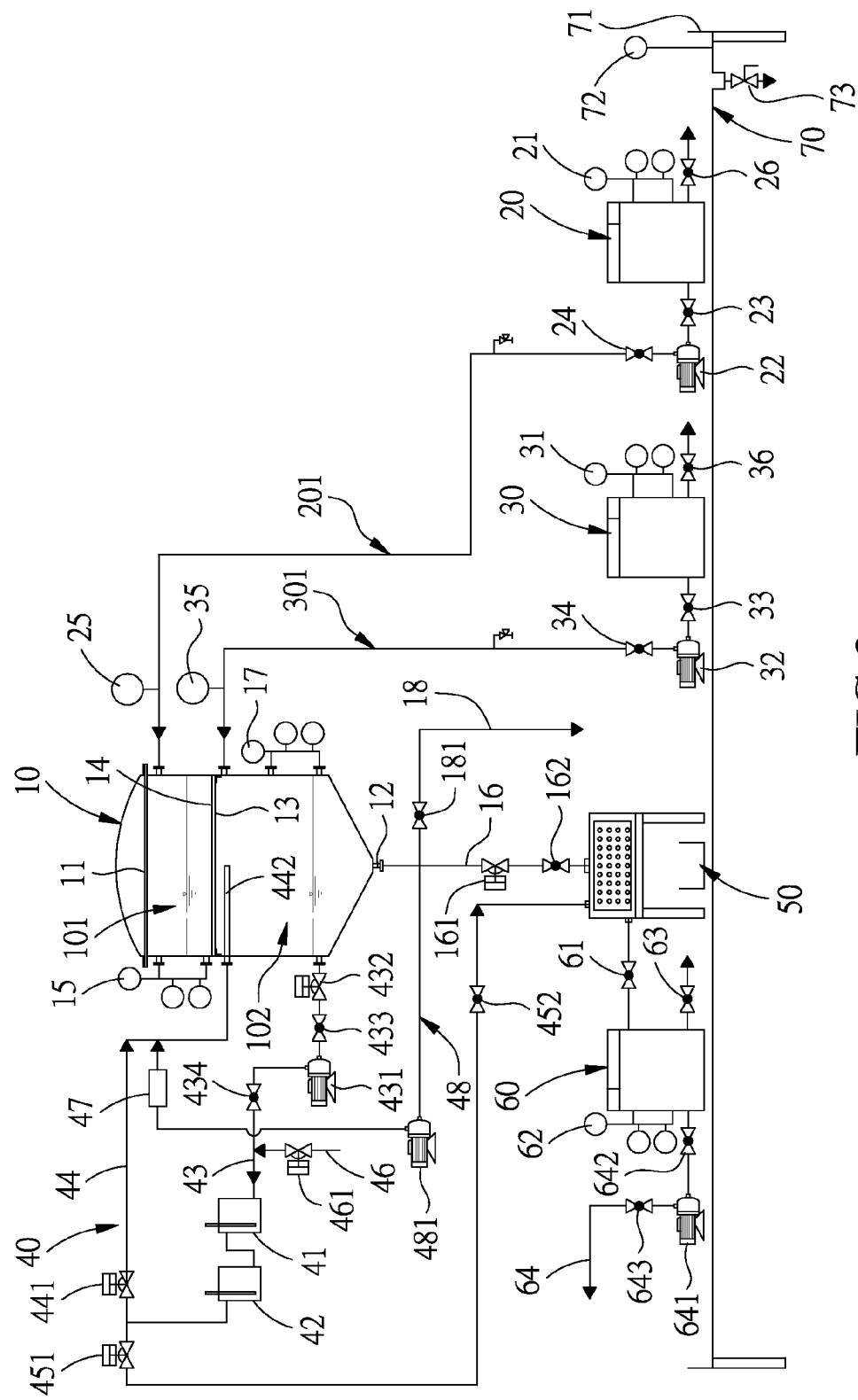
FIG. 2 shows a crystallization system for producing sodium aluminum fluoride cryolite from hydrofluoric acid waste in accordance with the present invention.
Figure 3:
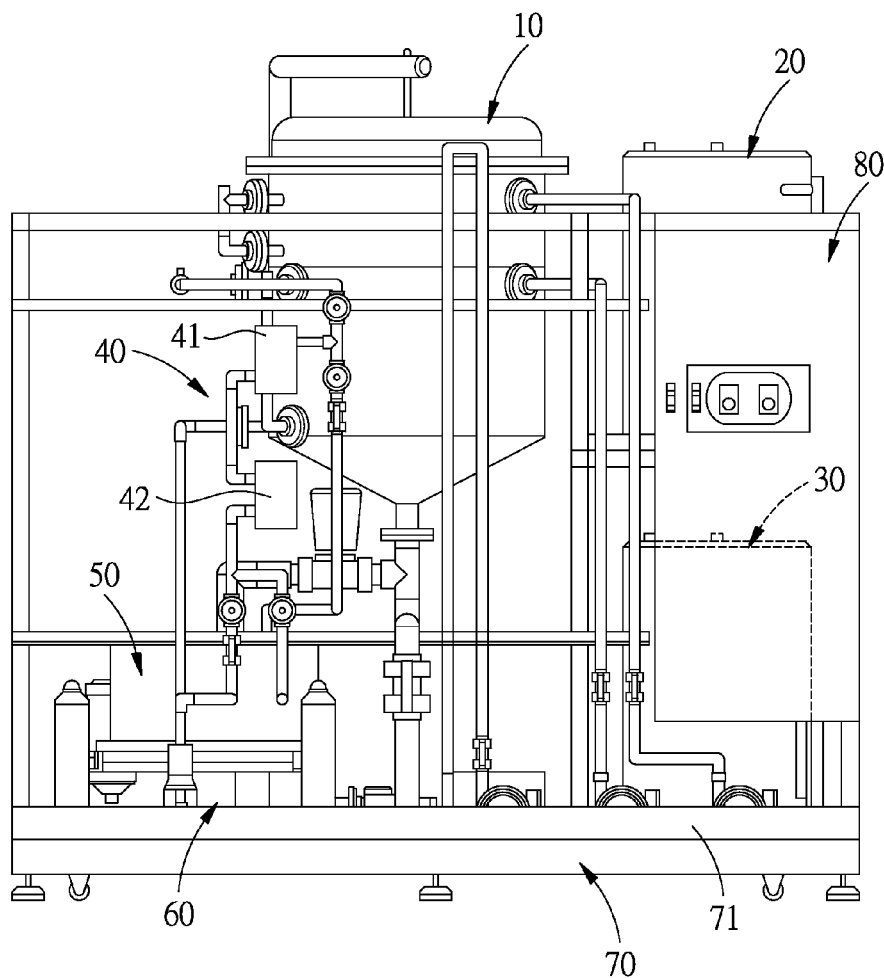
FIG. 3 is a side view showing that the crystallization system for producing sodium aluminum fluoride cryolite from hydrofluoric acid waste in accordance with the present invention is disposed on an anti-overflow base.
Figure 4:
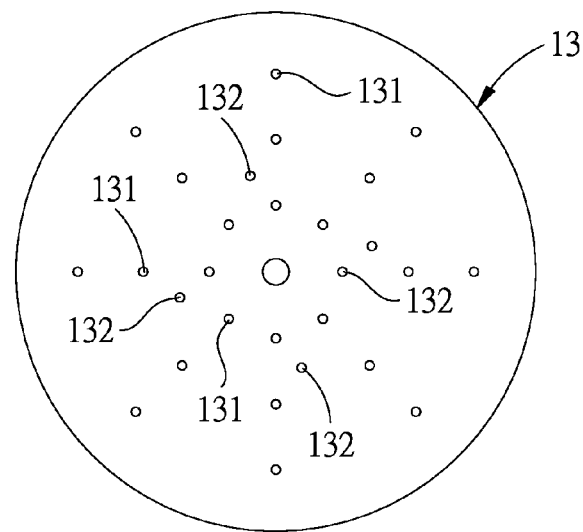
FIG. 4 is a plan view of a control plate of the crystallization system in accordance with the present invention.
Figure 5:
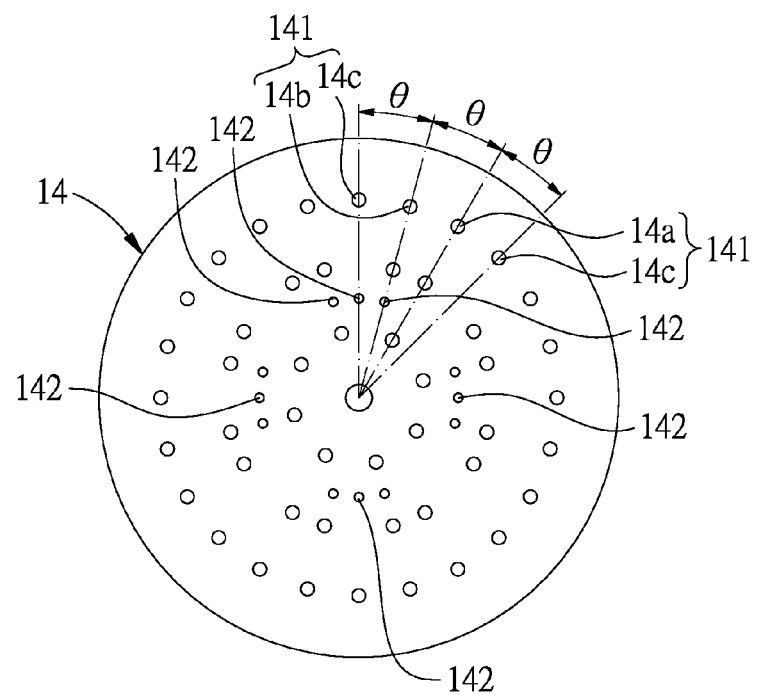
FIG. 5 is a plan view of a dispersing plate of the crystallization system in accordance with the present invention.
Figure 6:
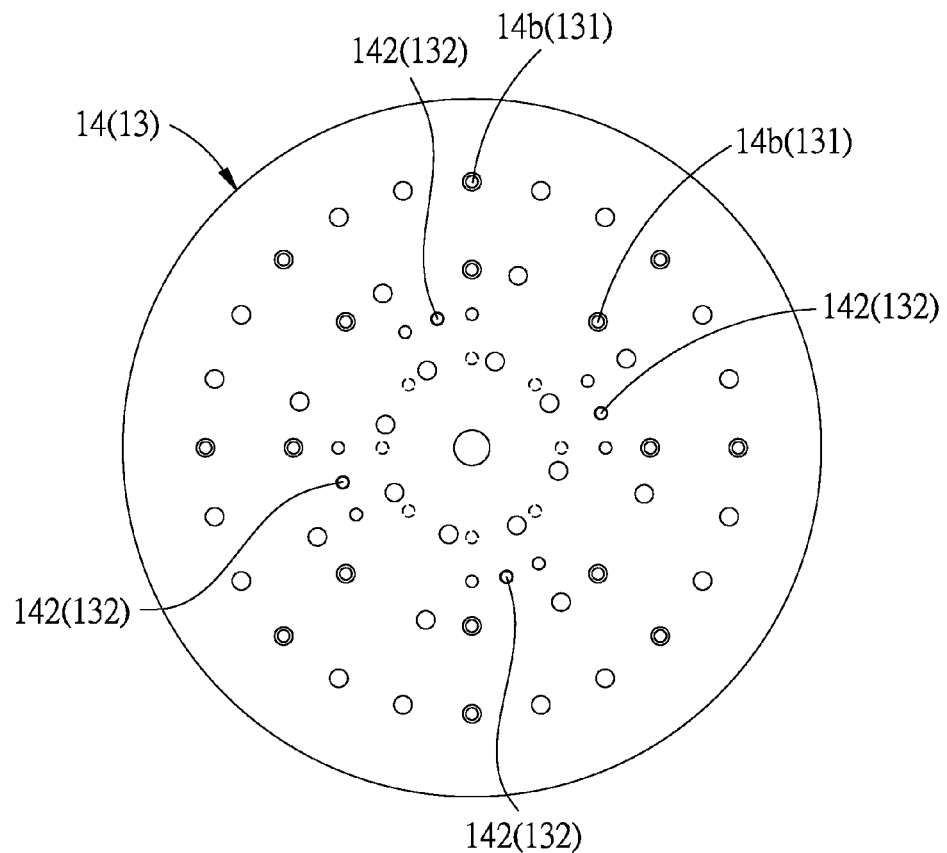
FIG. 6 shows that the dispersing apertures of the dispersing plate are aligned to the control apertures of the second group of the control plate of the present invention.
Figure 7:
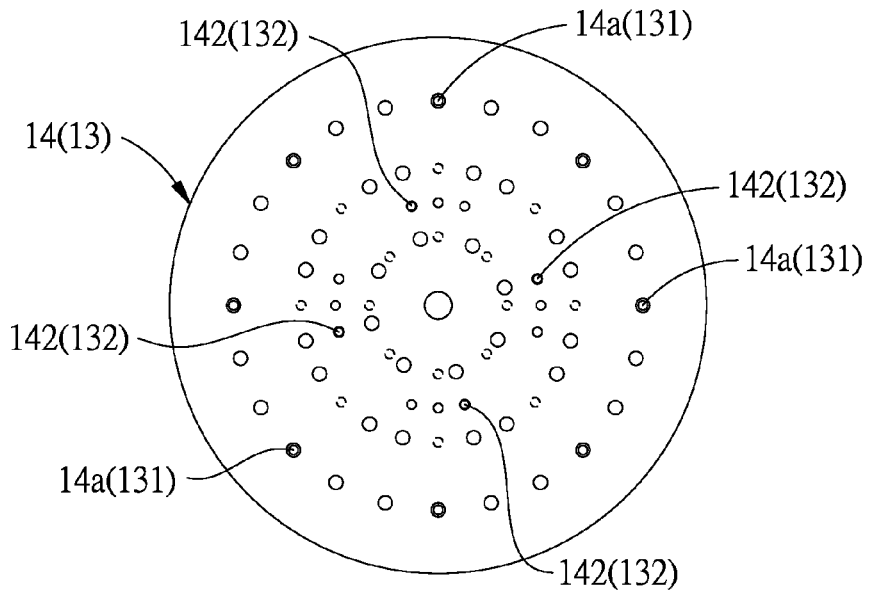
FIG. 7 shows that the dispersing apertures of the dispersing plate are aligned to the control apertures of the first group of the control plate of the present invention.
Figure 8:
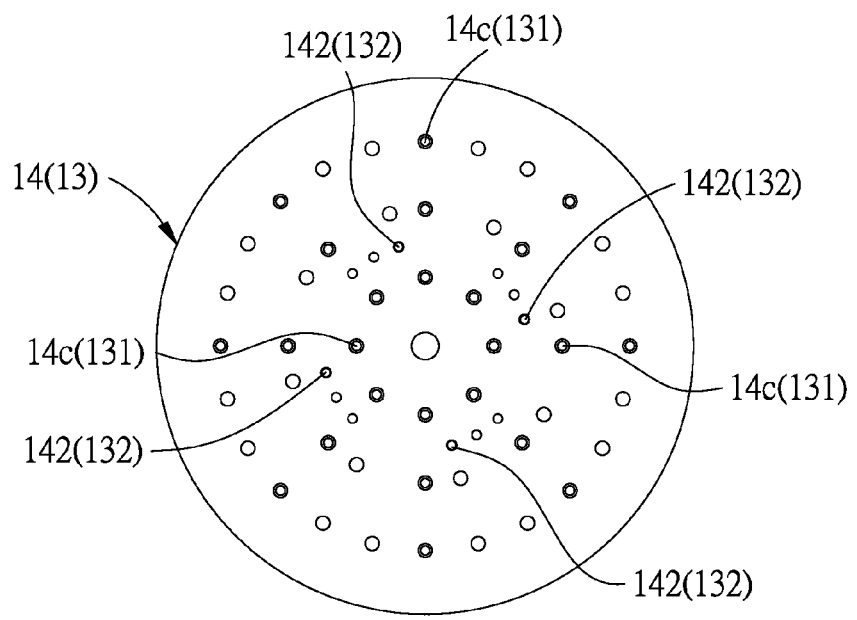
FIG. 8 shows that the dispersing apertures of the dispersing plate are aligned to the control apertures of the third group of the control plate of the present invention.

Referring to FIGS. 2 and 3, a crystallization system for producing sodium aluminum fluoride cryolite from hydrofluoric acid waste in accordance with the present invention comprises: a crystallization reaction tank 10, a sodium aluminate tank 20, a high concentration hydrofluoric acid waste tank 30, a pH value/fluoride detecting section 40, a dehydrator 50, a low concentration hydrofluoric acid waste tank 60, and a control device 80 for electrically controlling the operation of the former parts 10-60.

The crystallization reaction tank 10 includes a top input port 11 and a bottom output port 12. Inside the crystallization reaction tank 10 are disposed a dispersing plate 13 which is formed with a plurality of dispersing apertures 131, and a control plate 14 which is located above the dispersing plate 13 and formed with a plurality of control apertures 141, so that the interior of the crystallization reaction tank 10 is divided by the dispersing plate 13 and the control plate 14 into an upper dosing space 101 and a lower reaction space 102. In the upper dosing space 101 is provided a sodium aluminate level meter 15. The lower reaction space 102 is in communication with a discharge control section 16 via the bottom output port 12. The sodium aluminate level meter 15 and the discharge control section 16 are electrically controlled by the control device 80.

In this embodiment, in the lower reaction space 102 of the crystallization reaction tank 10 is provided a hydrofluoric acid level meter 17 which is electrically controlled by the control device 80 to detect the level of the hydrofluoric acid contained in the lower reaction space 102. With the sodium aluminate level meter 15 and the hydrofluoric acid level meter 17, the control device 80 is capable of electrically controlling the flow rate of the sodium aluminate and the hydrofluoric acid flowing out of the sodium aluminate tank 20 and the high concentration hydrofluoric acid waste tank 30. The discharge control section 16 is provided with a flow rate control valve 161 and a ball valve 162. Between the flow rate control valve 161 and the bottom output port 12 of the crystallization reaction tank 10 is disposed a discharge passage 18 which is controlled by a ball valve 181. The flow rate control valve 161 and the ball valve 162 of the discharge control section 16, and the ball valve 181 of the discharge passage 18 are electrically controlled by the control device 80.

The sodium aluminate tank 20 includes a batch dosing control section 201 through which sodium aluminate flows from the sodium aluminate tank 20 to the upper dosing space 101 of the crystallization reaction tank 10, and the batch dosing control section 201 is electrically controlled by the control device 80. In this embodiment, the sodium aluminate tank 20 is provided with a level meter 21 and a discharge valve 26. The batch dosing control section 201 of the sodium aluminate tank 20 is provided with a transportation pump 22, and two ball valves 23, 24 disposed between the transportation pump 22 and the sodium aluminate tank 20, and between the transportation pump 22 and the crystallization reaction tank 10, respectively. The batch dosing control section 201 is further provided with a sodium aluminate level meter 25 which is located adjacent to the crystallization reaction tank 10. The level meter 21, the transportation pump 22, the two ball valves 23, 24, the sodium aluminate level meter 25, and the discharge valve 26 are electrically controlled by the control device 80.

The high concentration hydrofluoric acid waste tank 30 includes a batch dosing control section 301 through which high concentration hydrofluoric acid waste is transported from the high concentration hydrofluoric acid waste tank 30 to the lower reaction space 102 of the crystallization reaction tank 10, and the batch dosing control section 301 is electrically controlled by the control device 80. In this embodiment, the high concentration hydrofluoric acid waste tank 30 is provided with a level meter 31 and a discharge valve 36. The batch dosing control section 301 of the high concentration hydrofluoric acid waste tank 30 is provided with a transportation pump 32, and two ball valves 33, 34 disposed between the transportation pump 32 and the high concentration hydrofluoric acid waste tank 30, and between the transportation pump 32 and the crystallization reaction tank 10, respectively. The batch dosing control section 301 is further provided with a hydrofluoric acid level meter 35 which is located adjacent to the crystallization reaction tank 10. The level meter 31, the transportation pump 32, the two ball valves 33, 34, the hydrofluoric acid level meter 35, and the discharge valve 36 are electrically controlled by the control device 80.

The pH value/fluoride detecting section 40 includes a pH meter 41 and a fluoride meter 42 which are electrically connected by wires and controlled by the control device 80. The pH meter 41 includes a first passage 43 which is in communication with the bottom of the lower reaction space 102 of the crystallization reaction tank 10. The first passage 43 is provided with a metering pump 431, a flow rate control valve 432, and two ball valves 433, 434 which are disposed between the metering pump 431 and the crystallization reaction tank 10, and between the metering pump 431 and the pH meter 41, respectively. In this embodiment, between the metering pump 431 and the pH meter 41 is further disposed a clear water input section 46 which is provided with a flow rate control valve 461 for controlling the amount of clear water which is inputted to the pH meter 41 and the fluoride meter 42 to detect the pH value of the aqueous mixture of the sodium aluminate and hydrofluoric acid waste, and to detect the fluoride concentration. After detection, the aqueous mixture flows back to the crystallization reaction tank 10 via a second passage 44 of the fluoride meter 42 which is in communication with the top of the lower reaction space 102, and the second passage 44 is provided with a backflow control valve 441. Or the aqueous mixture is discharged to the dehydrator 50 via a third passage 45 of the fluoride meter 42, and the third passage 45 is in communication with the dehydrator 50 and provided with a discharge control valve 451 and a ball valve 452 for controlling the discharge of the aqueous mixture. The end of the second passage 44, which is connected to the crystallization reaction tank 10, is located at the top surface of the lower reaction space 102, and preferably the second passage 44 extends to the top center of the lower reaction space 102 by a pipe 442, so as to reduce the influence of the backflow of the aqueous mixture on the crystallization process to the least.

To ensure the detection accuracy of the pH meter 41 and the fluoride meter 42, the pH value/fluoride detecting section 40 can use the clear water input section 46 to input clear water to the pH meter 41 and the fluoride meter 42, then the aqueous mixture is discharged to the dehydrator 50 via the third passage 45. The metering pump 431, the two flow rate control valves 432, 461, the three ball valves 433, 434, 452, and the discharge control valve 451 of the pH value/fluoride detecting section 40 are all electrically controlled by the control device 80. Furthermore, the present invention can also be provided with a fourth passage 48 in communication with the second passage and the discharge control section 16. The fourth passage 48 is provided with a crystal seed tank 47 and a transportation pump 481. The fourth passage 48 is in communication with the crystallization reaction tank 10 and the discharge control section 16, and the transportation pump 481 is disposed between the crystal seed tank 47 and the discharge control section 16, so that when the aqueous mixture flows back from the discharge control section 16 to the crystallization reaction tank 10 via the second passage 44 and the fourth passage 48, it will flow through the crystal seed tank 47 and carry crystal seed to the crystallization reaction tank 10, so as to finish the seed planting process, accelerate the crystallization process, increase the crystallization grain size, and improve the cryolite quality.

The dehydrator 50 is electrically controlled to operate by the control device 80 and in communication with the discharge control section 16 of the crystallization reaction tank 10, and used to filtrate the aqueous mixture of the of the sodium aluminate and hydrofluoric acid waste and to filtrate out the cryolite. The dehydrator 50 is also in communication with the third passage 45 of the pH value/fluoride detecting section 40 to discharge the waste liquid left after cleaning the pH value/fluoride detecting section 40.

The low concentration hydrofluoric acid waste tank 60 is electrically controlled by the control device 80 to collect the low concentration hydrofluoric acid waste discharged from the dehydrator 50. In this embodiment, between the low concentration hydrofluoric acid waste tank 60 and the dehydrator 50 is disposed a ball valve 61 for controlling the follow rate of the low concentration hydrofluoric acid waste. The low concentration hydrofluoric acid waste tank 60 is provided with a level meter 62, a discharge valve 63 and a low concentration hydrofluoric acid waste discharge section 64. The low concentration hydrofluoric acid waste discharge section 64 is provided with a transportation pump 641, and two ball valves 642, 643 which are located between the transportation pump 641 and the low concentration hydrofluoric acid waste tank 60, and located at the discharge end of the transportation pump 641. The level meter 62, the discharge valve 63, the transportation pump 641 and the three ball valves 61, 642, 643 are all electrically controlled by the control device 80.

As shown in FIGS. 2 and 3, the crystallization system for producing sodium aluminum fluoride cryolite from hydrofluoric acid waste in accordance with the present invention can be disposed on an anti-overflow base 70. Around the peripheral edge of the anti-overflow base 70 is provided an anti-overflow member 71 to prevent overflow of liquid from the anti-overflow base 70. The anti-overflow base 70 is provided with a leak detector 72 and a discharge valve 73 which is located at the bottom of the anti-overflow base 70. The leak detector 72 and the discharge valve 73 are electrically controlled by the control device 80. The lead detector 72 is used to detect leaks, and once a leak is detected, the discharge valve 73 will be electrically opened to discharge liquid from the anti-overflow base 70.

Referring then to FIGS. 4-8, the dispersing plate 13 and the control plate 14 disposed in the crystallization reaction tank 10 are circular-shaped. The dispersing apertures 131 are arranged along radial lines extending radially from the center of the dispersing plate 13. The control apertures 141 of the control plate 14 include a first group 14a of control apertures, a second group 14b of control apertures and a third group 14c of control apertures which are disposed along lines extending radially from the center of the control plate 14, in a manner that the control apertures 141 of the first group 14a are located along a radial line extending radially from the center of the control plate 14, the control apertures 141 of the second group 14b are located along a radial line next to the line of the first group 14a, the control apertures 141 of the third group 14c are arranged along a radial line next to the line of the second group 14b, and the radial lines are spaced apart by an angle $\theta$. The number of the control apertures 141 of the first group 14a is equal to the number of the dispersing apertures 131 of the dispersing plate 13, and the number of the control apertures of the second group 14b and the number of the third group 14c are less than the number of the dispersing apertures 131 of the dispersing plate 13.

In this embodiment, the dispersing plate 13 is further provided with a plurality of positioning apertures 132, and the control plate 14 is provided with a corresponding number of positioning apertures 142 which are aligned to the positioning apertures 132 and divided into three groups which are spaced apart by an angle θ. The positioning apertures 142 of one of the groups of the control plate 14 are aligned and connected to the positioning apertures 132 of the dispersing plate 13 by fasteners (not shown), so that the dispersing plate 13 and the control plate 14 are fixed to each other, and the dispersing apertures 131 and the control apertures 141 are aligned with each other, so as to control the flow rate and liquid form of the sodium aluminate solution.

Figure 9:
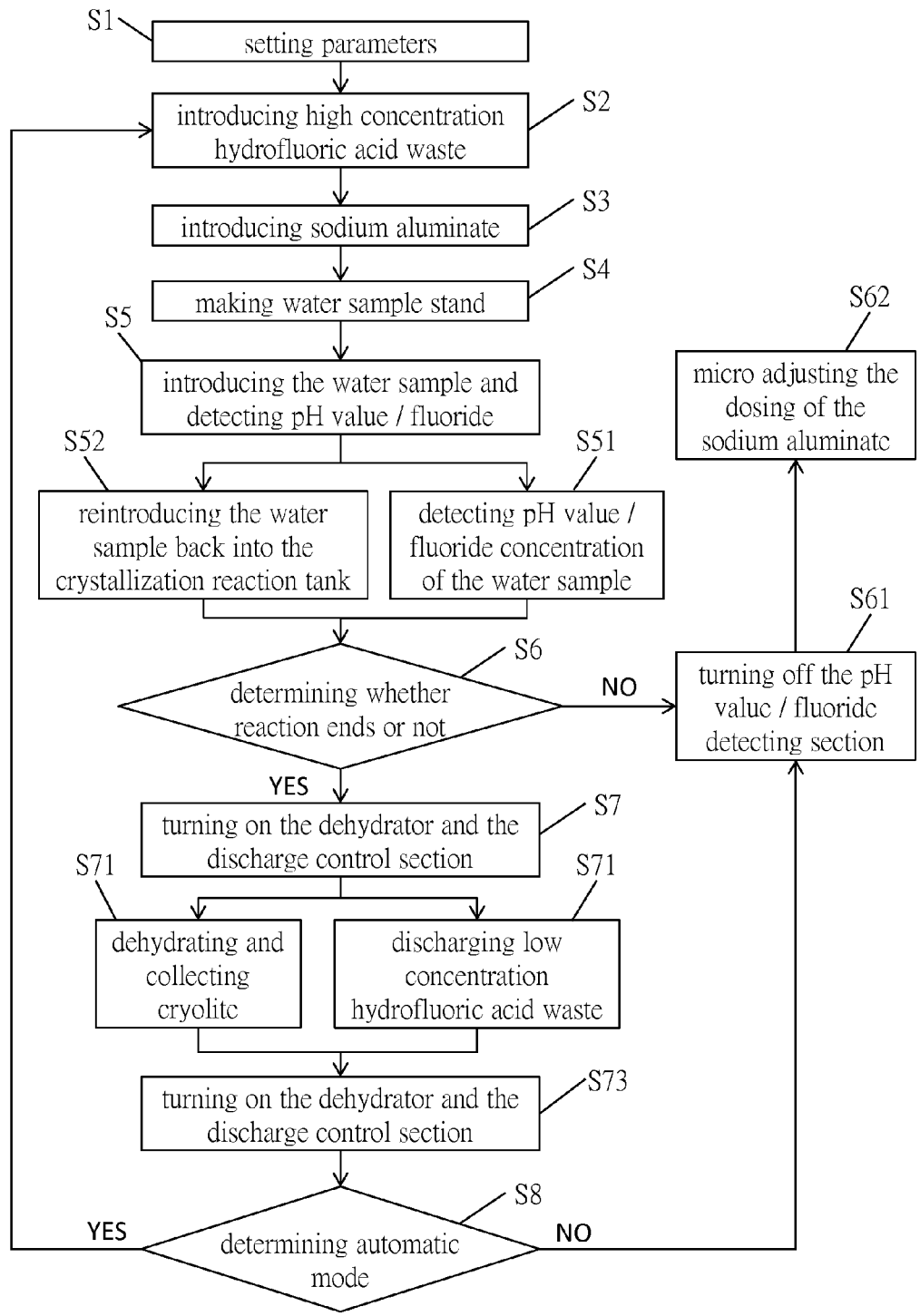
FIG. 9 is a flow chart showing a method for producing sodium aluminum fluoride cryolite from hydrofluoric acid waste in accordance with the present invention.

What mentioned above are the crystallization system for producing sodium aluminum fluoride cryolite from hydrofluoric acid waste in accordance with the present invention, the relations of the components of the crystallization system, and the assembly relation between the dispersing plate 13 and the control plate 14. As shown in FIGS. 2 and 9, the valves, level meters, flow rate meters, pumps, pH meters and fluoride meters of the crystallization system of the present invention are all electrically connected to and controlled to operate by the control device 80. The crystallization system for producing sodium aluminum fluoride cryolite from hydrofluoric acid waste in accordance with the present invention can be operated automatically or manually, and the method for operating the crystallization system includes the following steps:

Step S1 of setting parameters: using the control device 80 to set parameters according to the parameters and items as shown in table 1, and the items are not limited to those listed in the table 1 and can be adjusted as desired. After all parameters are set during step S1, the dispersing plate 13 and the control plate 14 are set to meet the flow rate requirement of the sodium aluminate, so as to control the flow rate of the sodium aluminate flowing into the lower reaction space 102.

TABLE 1 parameter setting

| item | Range of parameters |
| --- | --- |
| Amount of high-HF to be used | 30-60 liter |
| Amount of sodium aluminate to be used at the beginning | 30-60 liter |
| Micro adjust the amount of the sodium aluminate to be used | 100-500 毫升 |
| Reaction-end pH value setting | 3-10 minutes |
| Dehydrator running time setting | 30 seconds-5minutes |
| Reaction standing time | 10-70 minutes |
| Micro adjustment of reaction standing time | 5-10 minutes |
| time duration for detection | 5-20 minutes |
| time duration for cleaning the monitoring system with clear water | 1-5 minutes |

Step S2 of introducing high concentration hydrofluoric acid waste: turning on the batch dosing control section 301 of the high concentration hydrofluoric acid waste tank 30 to introduce high concentration hydrofluoric acid into the lower reaction space 102 of the crystallization reaction tank 10 by the amount set in the step S1.

Step S3 of introducing sodium aluminate: (after the high concentration hydrofluoric acid waste tank 30 is introduced into the crystallization reaction tank 10) turning on the batch dosing control section 201 of the sodium aluminate tank 20 to introduce sodium aluminate into the upper dosing space 101 of the crystallization reaction tank 10. In this step, it is better to start to count the length of time for introducing the sodium aluminate, when the batch dosing control section 201 of the sodium aluminate tank 20 is turned on.

Step S4 of making water sample stand: letting the water sample which is the aqueous mixture of the sodium aluminate and high concentration hydrofluoric acid waste stand for the length of time set in the step S1. In this step, it is preferably to start counting the length of time that the water sample stands, when the level meter 21 detects a low level of sodium aluminate in the sodium aluminate tank 20.

Step S5 of introducing the water sample and detecting pH value/fluoride: (when the time for the water sample to stand is over) turning on the metering pump 431, the flow rate control valve 432 and the backflow control valve 441 of the pH value/fluoride detecting section 40, to introduce the water sample from the crystallization reaction tank 10 into the pH value/fluoride detecting section 40. This step further includes a step S51 of detecting pH value/fluoride concentration of the water sample, and a step S52 of reintroducing the water sample back into the crystallization reaction tank 10, namely, when the water sample flows through the pH meter 41 and the fluoride meter 42 to detect the pH value and the fluoride concentration, it is also controlled by valves to flow through the crystal seed tank 47 and carry crystal seed to the crystallization reaction tank 10, via the output port 12 of the crystallization reaction tank 10, the discharge control section 16 and the fourth passage 48.

Step S6 of determining whether reaction ends or not: determining whether reaction ends or not based on the pH value and fluoride concentration detected. A step S61 of turning off the pH value/fluoride detecting section, and a step S62 of micro adjusting the dosing of the sodium aluminate by the amount set in the step S1, are carried out if the reaction does not end. Step S62 is to introduce a micro amount of sodium aluminate into the crystallization reaction tank 10, based on the parameters set in the step S1 and based on the pH value detected. Then, steps S3, S4, S5 and S6 will be carried out again until the reaction ends (is finished). For the pH value and the amount of the sodium aluminate to be introduced in the step S62, please refer to the parameters as shown in table 2, and parameters shown in table 2 are considered as exemplary only and can be adjusted in practical use.

TABLE 2

| pH | Amount of sodium aluminate to be introduced (ml) |
| --- | --- |
| <1 | 500 |
| 1-2 | 300 |
| 2-3 | 200 |
| 3-4 | 100 |

Step S7 of turning on the dehydrator and the discharge control section: (when the reaction is finished) turning on the dehydrator and the discharge control section 16 of the crystallization reaction tank 10. Then, a step S71 of dehydrating and collecting cryolite, and a step S72 of discharging low concentration hydrofluoric acid waste are carried out, and after that, a step S73 of turning off the discharge control section of the crystallization reaction tank is carried out. In this step, the dehydrator 50 is preferably to reach a predetermined rotation speed before the step of S71, the cryolite and low concentration hydrofluoric acid waste fall into the dehydrator 50 by gravity, and the low concentration hydrofluoric acid waste drained out by centrifugal force will be collected and flow into the low concentration hydrofluoric acid waste tank 60, so that the step S72 is finished. The cryolite left in the dehydrator 50 will be collected, so that the step S71 is finished, and finally, the discharge control section 16 of the crystallization reaction tank 10 is turned off.

Step S8 of determining automatic mode: the control device 80 is preset to automatic mode or manual mode, and when it is in an automatic mode, then the control device 80 will automatically control the crystallization system to start the previous operations from step S2. When it is in manual mode, the control device 80 will stop the automatic control, and the operation will start from the step S1 again to finish the parameter setting, and then the control device will start automatic control.

With the crystallization system for producing sodium aluminum fluoride cryolite from hydrofluoric acid waste in accordance with the present invention, and the method for using it, the fluoride concentration of the hydrofluoric acid waste after reaction can be reduced to be lower than 20 g/l, under the condition that the fluoride concentration of the hydrofluoric acid waste before reaction is 10-500 g/l, time duration for standing is 10-200 minutes, and the end-of-reaction pH value is 2-10. Table 3 shows the operation parameters and relative analysis data used in five experiments conducted by using the crystallization system for producing sodium aluminum fluoride cryolite from hydrofluoric acid waste in accordance with the present invention.

TABLE 3 operation parameters and data of the experiments

| | | Experiment 1 | Experiment 2 | Experiment three | Experiment four | Experiment five |
|---|---|---|---|---|---|---|
| high-HF waste level in the reaction tank | liter | 40 | 40 | 60 | 60 | 60 |
| fluoride concentration of the inputted liquid waste | Gram/liter | 93 | 93 | 64 | 64 | 64 |
| Total amount of the sodium aluminate inputted | liter | 32.1 | 31.5 | 35.6 | 37.3 | 36.8 |
| Sodium aluminate concentration | gram/1 liter water | 150 | 150 | 150 | 150 | 150 |
| Total length of operation time | minutes | 125 | 110 | 136 | 125 | 113 |
| Reaction-end pH value | — | 6.5 | 4.7 | 6.3 | 5.4 | 5.2 |
| Total length of time for crystallization on standing | minutes | 70 | 70 | 70 | 70 | 70 |
| fluoride concentration of the outputted liquid waste | milligram/liter | 2550 | 2360 | 2780 | 2220 | 1780 |
| Fluoride removal efficient | % | 97.2 | 97.4 | 95.6 | 96.5 | 97.2 |
| Solids moisture content | % | 13.5 | 13.9 | 12.4 | 12.9 | 14.2 |

With the dispersing plate and the control plate controlling the flow rate and liquid form of the sodium aluminate and the hydrofluoric acid waste, with the loop-like pH value/fluoride detecting section which is in communication with the reaction tank, and by detecting the pH value/fluoride concentration of the water sample which is the aqueous mixture of the sodium aluminate and hydrofluoric acid waste, the crystallization system and method for producing sodium aluminum fluoride cryolite from hydrofluoric acid waste in accordance with the present invention, are capable of effectively controlling the factor affecting the cryolite purity during the operation process. Hence, it ensures that the crystallization system can produce cryolite whose purity is good enough for recycling.

While we have shown and described various embodiments in accordance with the present invention, it is clear to those skilled in the art that further embodiments may be made without departing from the scope of the present invention.

What is claimed is:

1. A crystallization system for producing sodium aluminum fluoride cryolite from hydrofluoric acid waste, comprising:

a control device;

a crystallization reaction tank 10 including a top input port 11 and a bottom output port 12, inside the crystallization reaction tank 10 being disposed a dispersing plate 13 which is formed with a plurality of dispersing apertures 131, and a control plate 14 being located above the dispersing plate 13 and formed with a plurality of control apertures 141, an interior of the crystallization reaction tank 10 being divided by the dispersing plate 13 and the control plate 14 into an upper dosing space 101 and a lower reaction space 102, in the upper dosing space 101 being provided a sodium aluminate level meter 15, the lower reaction space 102 being in communication with a discharge control section 16 via the bottom output port 12 to discharge cryolite and low concentration hydrofluoric acid waste produced by reaction, the sodium aluminate level meter 15 and the discharge control section 16 being electrically controlled by the control device 80;

a sodium aluminate tank 20 being electrically controlled by the control device 80 and including a batch dosing control section 201 through which sodium aluminate flows from the sodium aluminate tank 20 to the upper dosing space 101 of the crystallization reaction tank 10;

a high concentration hydrofluoric acid waste tank 30 being electrically controlled by the control device 80 and including a batch dosing control section 301 through which high concentration hydrofluoric acid waste is transported from the high concentration hydrofluoric acid waste tank 30 to the lower reaction space 102 of the crystallization reaction tank 10; and a pH value/fluoride detecting section 40 including a pH meter 41 and a fluoride meter 42 which are electrically connected by wires and controlled by the control device 80, the pH meter 41 including a first passage 43 which is in communication with a bottom of the lower reaction space 102 of the crystallization reaction tank 10, the fluoride meter 42 including a second passage 44 which is in communication with a top of the lower reaction space 102.

2. The crystallization system for producing sodium aluminum fluoride cryolite from hydrofluoric acid waste as claimed in claim 1, wherein the sodium aluminate tank 20 is provided with a level meter 21 and a discharge valve 26, the batch dosing control section 201 of the sodium aluminate tank 20 is provided with a transportation pump 22, and two ball valves 23, 24 disposed between the transportation pump 22 and the sodium aluminate tank 20, and between the transportation pump 22 and the crystallization reaction tank 10, respectively. The batch dosing control section 201 is further provided with a sodium aluminate level meter 25 which is located adjacent to the crystallization reaction tank 10, the level meter 21, the transportation pump 22, the two ball valves 23, 24, the sodium aluminate level meter 25, and the discharge valve 26 are electrically controlled by the control device 80.

3. The crystallization system for producing sodium aluminum fluoride cryolite from hydrofluoric acid waste as claimed in claim 1, wherein the high concentration hydrofluoric acid waste tank 30 is provided with a level meter 31 and a discharge valve 36, the batch dosing control section 301 of the high concentration hydrofluoric acid waste tank 30 is provided with a transportation pump 32, and two ball valves 33, 34 disposed between the transportation pump 32 and the high concentration hydrofluoric acid waste tank 30, and between the transportation pump 32 and the crystallization reaction tank 10, respectively, the batch dosing control section 301 is further provided with a hydrofluoric acid level meter 35 which is located adjacent to the crystallization reaction tank 10, the level meter 31, the transportation pump 32, the two ball valves 33, 34, the hydrofluoric acid level meter 35, and the discharge valve 36 are electrically controlled by the control device 80.

4. The crystallization system for producing sodium aluminum fluoride cryolite from hydrofluoric acid waste as claimed in claim 1, wherein a hydrofluoric acid level meter 17 which is electrically controlled by the control device 80 is disposed in the lower reaction space 102 of the crystallization reaction tank 10, the discharge control section 16 is provided with a flow rate control valve 161 and a ball valve 162, between the flow rate control valve 161 and the bottom output port 12 of the crystallization reaction tank 10 is disposed a discharge passage 18 which is controlled by a ball valve 181, the flow rate control valve 161 and the ball valve 162 of the discharge control section 16, and the ball valve 181 of the discharge passage 18 are electrically controlled by the control device 80.

5. The crystallization system for producing sodium aluminum fluoride cryolite from hydrofluoric acid waste as claimed in claim 1, wherein the first passage 43 is provided with a metering pump 431, a flow rate control valve 432, and a ball valve 433 which are disposed between the metering pump 431 and the crystallization reaction tank 10, and between the metering pump 431 and the pH meter 41, respectively, between the metering pump 431 and the pH meter 41 is further disposed a ball valve 434, and a clear water input section 46 which is provided with a flow rate control valve 461 for controlling amount of clear water to be inputted, the second passage 44 is provided with a backflow control valve 441, the fluoride meter 42 further includes a third passage 45 which is provided with a discharge control valve 451 and a ball valve 452 for controlling the discharge of aqueous waste, the metering pump 431, the two flow rate control valves 432, 461, the three ball valves 433, 434, 452, and the discharge control valve 451 of the pH value/fluoride detecting section 40 are all electrically controlled by the control device 80.

6. The crystallization system for producing sodium aluminum fluoride cryolite from hydrofluoric acid waste as claimed in claim 5, wherein an end of the second passage 44, which is connected to the crystallization reaction tank 10, is located at a top surface of the lower reaction space 102, and a top center of the lower reaction space 102.

7. The crystallization system for producing sodium aluminum fluoride cryolite from hydrofluoric acid waste as claimed in claim 1, wherein the discharge control section 16 is connected to a dehydrator 50 and a low concentration hydrofluoric acid waste tank 60 to separate cryolite and low concentration hydrofluoric acid waste, the dehydrator 50 is electrically controlled to operate by the control device 80 and in communication with the discharge control section 16 of the crystallization reaction tank 10, the low concentration hydrofluoric acid waste tank 60 is electrically controlled by the control device 80 to collect the low concentration hydrofluoric acid waste discharged from the dehydrator 50.

8. The crystallization system for producing sodium aluminum fluoride cryolite from hydrofluoric acid waste as claimed in claim 7, wherein between the low concentration hydrofluoric acid waste tank 60 and the dehydrator 50 is disposed a ball valve 61 for controlling the follow rate of the low concentration hydrofluoric acid waste, the low concentration hydrofluoric acid waste tank 60 is provided with a level meter 62, a discharge valve 63 and a low concentration hydrofluoric acid waste discharge section 64, the low concentration hydrofluoric acid waste discharge section 64 is provided with a transportation pump 641, and two ball valves 642, 643 which are located between the transportation pump 641 and the low concentration hydrofluoric acid waste tank 60, and located at the discharge end of the transportation pump 641, the level meter 62, the discharge valve 63, the transportation pump 641 and the three ball valves 61, 642, 643 are all electrically controlled by the control device 80.

9. The crystallization system for producing sodium aluminum fluoride cryolite from hydrofluoric acid waste as claimed in claim 1 is disposed on an anti-overflow base 70, around a peripheral edge of the anti-overflow base 70 is provided an anti-overflow member 71, the anti-overflow base 70 is provided with a leak detector 72 and a discharge valve 73 which is located at a bottom of the anti-overflow base 70, and the leak detector 72 and the discharge valve 73 are electrically controlled by the control device 80.

10. The crystallization system for producing sodium aluminum fluoride cryolite from hydrofluoric acid waste as claimed in claim 1, wherein the dispersing plate 13 and the control plate 14 are circular-shaped, the dispersing apertures 131 are arranged along radial lines extending radially from a center of the dispersing plate 13, the control apertures 141 of the control plate 14 include a first group 14*a* of control apertures, a second group 14b of control apertures and a third group 14c of control apertures which are disposed along lines extending radially from a center of the control plate 14, in a manner that the control apertures 141 of the first group 14a are located along a radial line extending radially from the center of the control plate 14, the control apertures 141 of the second group 14b are located along a radial line next to the line of the first group 14a, the control apertures 141 of the third group 14c are arranged along a radial line next to the line of the second group 14b, and the radial lines are spaced apart by an angle θ, the number of the control apertures 141 of the first group 14a is equal to the number of the dispersing apertures 131 of the dispersing plate 13, and the number of the control apertures of the second group 14b and the number of the third group 14c are less than the number of the dispersing apertures 131 of the dispersing plate 13.

11. The crystallization system for producing sodium aluminum fluoride cryolite from hydrofluoric acid waste as claimed in claim 10, wherein the dispersing plate 13 is further provided with a plurality of positioning apertures 132, and the control plate 14 is provided with a corresponding number of positioning apertures 142 which are aligned to the positioning apertures 132 and divided into three groups which are spaced apart by an angle θ, the positioning apertures 142 of one of the groups of the control plate 14 are aligned and connected to the positioning apertures 132 of the dispersing plate 13 by fasteners.

12. A crystallization system for producing sodium aluminum fluoride cryolite from hydrofluoric acid waste, comprising:
 a control device;
 a crystallization reaction tank 10 including a top input port 11 and a bottom output port 12, inside the crystallization reaction tank 10 being disposed a dispersing plate 13 which is formed with a plurality of dispersing apertures 131, and a control plate 14 being located above the dispersing plate 13 and formed with a plurality of control apertures 141, an interior of the crystallization reaction tank 10 being divided by the dispersing plate 13 and the control plate 14 into an upper dosing space 101 and a lower reaction space 102, in the upper dosing space 101 being provided a sodium aluminate level meter 15, the lower reaction space 102 being in communication with a discharge control section 16 via the bottom output port 12 to discharge cryolite and low concentration hydrofluoric acid waste produced by reaction, the sodium aluminate level meter 15 and the discharge control section 16 being electrically controlled by the control device 80;
 a sodium aluminate tank 20 being electrically controlled by the control device 80 and including a batch dosing control section 201 through which sodium aluminate flows from the sodium aluminate tank 20 to the upper dosing space 101 of the crystallization reaction tank 10;
 a high concentration hydrofluoric acid waste tank 30 being electrically controlled by the control device 80 and including a batch dosing control section 301 through which high concentration hydrofluoric acid waste is transported from the high concentration hydrofluoric acid waste tank 30 to the lower reaction space 102 of the crystallization reaction tank 10; and
 a crystal seed tank 47 disposed in a fourth passage 48 which is in communication with the discharge control section 16 and the crystallization reaction tank 10, and between the discharge control section 16 and the crystallization reaction tank 10 is disposed a transportation pump 481.

13. The crystallization system for producing sodium aluminum fluoride cryolite from hydrofluoric acid waste as claimed in claim 12, wherein the sodium aluminate tank 20 is provided with a level meter 21 and a discharge valve 26, the batch dosing control section 201 of the sodium aluminate tank 20 is provided with a transportation pump 22, and two ball valves 23, 24 disposed between the transportation pump 22 and the sodium aluminate tank 20, and between the transportation pump 22 and the crystallization reaction tank 10, respectively. The batch dosing control section 201 is further provided with a sodium aluminate level meter 25 which is located adjacent to the crystallization reaction tank 10, the level meter 21, the transportation pump 22, the two ball valves 23, 24, the sodium aluminate level meter 25, and the discharge valve 26 are electrically controlled by the control device 80.

14. The crystallization system for producing sodium aluminum fluoride cryolite from hydrofluoric acid waste as claimed in claim 12, wherein the high concentration hydrofluoric acid waste tank 30 is provided with a level meter 31 and a discharge valve 36, the batch dosing control section 301 of the high concentration hydrofluoric acid waste tank 30 is provided with a transportation pump 32, and two ball valves 33, 34 disposed between the transportation pump 32 and the high concentration hydrofluoric acid waste tank 30, and between the transportation pump 32 and the crystallization reaction tank 10, respectively, the batch dosing control section 301 is further provided with a hydrofluoric acid level meter 35 which is located adjacent to the crystallization reaction tank 10, the level meter 31, the transportation pump 32, the two ball valves 33, 34, the hydrofluoric acid level meter 35, and the discharge valve 36 are electrically controlled by the control device 80.

15. The crystallization system for producing sodium aluminum fluoride cryolite from hydrofluoric acid waste as claimed in claim 12, wherein a hydrofluoric acid level meter 17 which is electrically controlled by the control device 80 is disposed in the lower reaction space 102 of the crystallization reaction tank 10, the discharge control section 16 is provided with a flow rate control valve 161 and a ball valve 162, between the flow rate control valve 161 and the bottom output port 12 of the crystallization reaction tank 10 is disposed a discharge passage 18 which is controlled by a ball valve 181, the flow rate control valve 161 and the ball valve 162 of the discharge control section 16, and the ball valve 181 of the discharge passage 18 are electrically controlled by the control device 80.

16. The crystallization system for producing sodium aluminum fluoride cryolite from hydrofluoric acid waste as claimed in claim 12 further comprising a pH value/fluoride detecting section 40 including a pH meter 41 and a fluoride meter 42 which are electrically connected by wires and controlled by the control device 80, the pH meter 41 including a first passage 43 which is in communication with a bottom of the lower reaction space 102 of the crystallization reaction tank 10, the fluoride meter 42 including a second passage 44 which is in communication with a top of the lower reaction space 102, and a third passage 45;
 wherein the first passage 43 is provided with a metering pump 431, a flow rate control valve 432, and a ball valve 433 which are disposed between the metering pump 431 and the crystallization reaction tank 10, and between the metering pump 431 and the pH meter 41, respectively, between the metering pump 431 and the pH meter 41 is further disposed a ball valve 434, and a clear water input section 46 which is provided with a flow rate control valve 461 for controlling amount of clear water to be inputted, the second passage 44 is provided with a backflow control valve 441, the fluoride meter 42 further includes a third passage 45 which is provided with a discharge control valve 451 and a ball valve 452 for controlling the discharge of aqueous waste, the metering pump 431, the two flow rate control valves 432, 461, the three ball valves 433, 434, 452, and the discharge control valve 451 of the pH value/fluoride detecting section 40 are all electrically controlled by the control device 80.

17. The crystallization system for producing sodium aluminum fluoride cryolite from hydrofluoric acid waste as claimed in claim 12, wherein the discharge control section 16 is connected to a dehydrator 50 and a low concentration hydrofluoric acid waste tank 60 to separate cryolite and low concentration hydrofluoric acid waste, the dehydrator 50 is electrically controlled to operate by the control device 80 and in communication with the discharge control section 16 of the crystallization reaction tank 10, the low concentration hydrofluoric acid waste tank 60 is electrically controlled by the control device 80 to collect the low concentration hydrofluoric acid waste discharged from the dehydrator 50.

18. The crystallization system for producing sodium aluminum fluoride cryolite from hydrofluoric acid waste as claimed in claim 17, wherein between the low concentration hydrofluoric acid waste tank 60 and the dehydrator 50 is disposed a ball valve 61 for controlling the follow rate of the low concentration hydrofluoric acid waste, the low concentration hydrofluoric acid waste tank 60 is provided with a level meter 62, a discharge valve 63 and a low concentration hydrofluoric acid waste discharge section 64, the low concentration hydrofluoric acid waste discharge section 64 is provided with a transportation pump 641, and two ball valves 642, 643 which are located between the transportation pump 641 and the low concentration hydrofluoric acid waste tank 60, and located at the discharge end of the transportation pump 641, the level meter 62, the discharge valve 63, the transportation pump 641 and the three ball valves 61, 642, 643 are all electrically controlled by the control device 80.

19. The crystallization system for producing sodium aluminum fluoride cryolite from hydrofluoric acid waste as claimed in claim 12 is disposed on an anti-overflow base 70, around a peripheral edge of the anti-overflow base 70 is provided an anti-overflow member 71, the anti-overflow base 70 is provided with a leak detector 72 and a discharge valve 73 which is located at a bottom of the anti-overflow base 70, and the leak detector 72 and the discharge valve 73 are electrically controlled by the control device 80.

20. The crystallization system for producing sodium aluminum fluoride cryolite from hydrofluoric acid waste as claimed in claim 12, wherein the dispersing plate 13 and the control plate 14 are circular-shaped, the dispersing apertures 131 are arranged along radial lines extending radially from a center of the dispersing plate 13, the control apertures 141 of the control plate 14 include a first group 14a of control apertures, a second group 14b of control apertures and a third group 14c of control apertures which are disposed along lines extending radially from a center of the control plate 14, in a manner that the control apertures 141 of the first group 14a are located along a radial line extending radially from the center of the control plate 14, the control apertures 141 of the second group 14b are located along a radial line next to the line of the first group 14a, the control apertures 141 of the third group 14c are arranged along a radial line next to the line of the second group 14b, and the radial lines are spaced apart by an angle θ, the number of the control apertures 141 of the first group 14a is equal to the number of the dispersing apertures 131 of the dispersing plate 13, and the number of the control apertures of the second group 14b and the number of the third group 14c are less than the number of the dispersing apertures 131 of the dispersing plate 13.

21. The crystallization system for producing sodium aluminum fluoride cryolite from hydrofluoric acid waste as claimed in claim 20, wherein the dispersing plate 13 is further provided with a plurality of positioning apertures 132, and the control plate 14 is provided with a corresponding number of positioning apertures 142 which are aligned to the positioning apertures 132 and divided into three groups which are spaced apart by an angle θ, the positioning apertures 142 of one of the groups of the control plate 14 are aligned and connected to the positioning apertures 132 of the dispersing plate 13 by fasteners.

22. The method for operating the crystallization system for producing sodium aluminum fluoride cryolite from hydrofluoric acid waste as claimed in claim 1, comprising:

a first step of using the control device 80 to set parameters, after all parameters are set, the dispersing plate 13 and the control plate 14 are set to meet flow rate requirement of the sodium aluminate, so as to control the flow rate of the sodium aluminate flowing into the lower reaction space 102;

a second step of turning on the batch dosing control section 301 of the high concentration hydrofluoric acid waste tank 30 to introduce high concentration hydrofluoric acid into the lower reaction space 102 of the crystallization reaction tank 10 by the amount set in first step;

a third step of turning on the batch dosing control section 201 of the sodium aluminate tank 20 to introduce sodium aluminate into the upper dosing space 101 of the crystallization reaction tank 10, after the high concentration hydrofluoric acid waste tank 30 is introduced into the crystallization reaction tank 10;

a fourth step of letting water sample stand for a length of time set in the first; the water sample is an aqueous mixture of sodium aluminate and high concentration hydrofluoric acid waste;

a fifth step of turning on the pH value/fluoride detecting section 40 to introduce the water sample from the crystallization reaction tank 10 into the pH value/fluoride detecting section 40, then carrying out a step of detecting pH value/fluoride concentration of the water sample, and a step of reintroducing the water sample back into the crystallization reaction tank 10;

a sixth step of determining whether reaction ends or not based on the pH value and fluoride concentration detected, if the reaction does not end, a step of turning off the pH value/fluoride detecting section, and a step of micro adjusting the dosing of the sodium aluminate will be carried out, then a step of introducing a micro amount of sodium aluminate into the crystallization reaction tank 10, based on the parameters set in the first step and based on the pH value detected is carried out, then, the third, fourth, fifth and sixth steps will be carried out again until the reaction ends; and a seventh step of turning on the dehydrator and the discharge control section of the crystallization reaction tank, then a step of dehydrating and collecting cryolite, and a step of discharging low concentration hydrofluoric acid waste are carried out, and after that, a step of turning off the discharge control section of the crystallization reaction tank is carried out.

23. The method for operating the crystallization system for producing sodium aluminum fluoride cryolite from hydrofluoric acid waste as claimed in claim 22, wherein the step of reintroducing the water sample back into the crystallization reaction tank 10 further involves discharging the water sample out of the discharge control section 16 of the crystallization tank 10, so that the water sample flows through the crystal seed tank 47 and carries crystal seed to the crystallization reaction tank 10.

24. The method for operating the crystallization system for producing sodium aluminum fluoride cryolite from hydrofluoric acid waste as claimed in claim 22 further comprising an eighth step of determining automatic mode, wherein the control device 80 is preset to automatic mode or manual mode, and when in an automatic mode, then the control device 80 will automatically control the crystallization system to start the previous operations from the second step, when it is in manual mode, the control device 80 will stop the automatic control, and the operation will start from the first step again to finish the parameter setting, and then the control device will start automatic control.

* * * * *